United States Patent
Rhu et al.

(10) Patent No.: US 9,856,161 B2
(45) Date of Patent: Jan. 2, 2018

(54) WASTEWATER TREATMENT APPARATUS CAPABLE OF PERFORMING BOTH INITIAL RAINWATER OVERFLOW TREATMENT AND PRIMARY TREATMENT, AND WASTEWATER TREATMENT METHOD ACCORDING TO SAID APPARATUS

(75) Inventors: Dae Hwan Rhu, Goyang-si (KR); Min Ki Jung, Seoul (KR); In Geun Park, Suwon-si (KR)

(73) Assignee: BOOKANG TECK CO., LTD., Seoul (KR)

( * ) Notice: Subject to any disclaimer, the term of this patent is extended or adjusted under 35 U.S.C. 154(b) by 575 days.

(21) Appl. No.: 14/389,804

(22) PCT Filed: Apr. 6, 2012

(86) PCT No.: PCT/KR2012/002649
§ 371 (c)(1),
(2), (4) Date: Oct. 1, 2014

(87) PCT Pub. No.: WO2013/151196
PCT Pub. Date: Oct. 10, 2013

(65) Prior Publication Data
US 2015/0060357 A1 Mar. 5, 2015

(51) Int. Cl.
*C02F 11/12* (2006.01)
*C02F 3/02* (2006.01)
(Continued)

(52) U.S. Cl.
CPC .......... *C02F 3/02* (2013.01); *C02F 1/001* (2013.01); *C02F 3/12* (2013.01); *C02F 11/12* (2013.01);
(Continued)

(58) Field of Classification Search
None
See application file for complete search history.

(56) References Cited

U.S. PATENT DOCUMENTS

| 6,821,445 B2 | 11/2004 | Miyata et al. |
| 2003/0106859 A1 | 6/2003 | Miyata et al. |

FOREIGN PATENT DOCUMENTS

| EP | 1380330 A1 | 1/2004 |
| JP | 2010-131472 A | 6/2010 |

(Continued)

OTHER PUBLICATIONS

English machine translation of Rhu et al. (KR 100879788).*
(Continued)

*Primary Examiner* — Michael H Wilson
*Assistant Examiner* — Katherine Will
(74) *Attorney, Agent, or Firm* — Harness, Dickey & Pierce, P.L.C.

(57) ABSTRACT

A wastewater treatment apparatus performs both initial rainwater overflow treatment and primary treatment. A wastewater treatment method according to the apparatus, the apparatus modifying an existing primary depositing reservoir to an up-flow high-speed filtration facility, the apparatus using a floating filter and biological filter paper applied to an existing depositing reservoir to perform an initial rainwater treatment. The apparatus can be applied to an existing wastewater treatment facility to eliminate the necessity of installing an additional facility for an initial rainwater treatment facility. The apparatus is further capable of adjusting the flow rate into a biological treatment facility to achieve a target water quality. The apparatus comprises: an up-flow high-speed filtration facility for filtering floating matter contained in wastewater using a floating filter; a sludge holding tank; a biological treatment facility for removing dissolved organic matter contained in the water discharged from the up-flow high-speed filtration facility; and a concentrator.

9 Claims, 9 Drawing Sheets

(51) Int. Cl.
*C02F 3/12* (2006.01)
*C02F 1/00* (2006.01)
*C02F 3/06* (2006.01)
*C02F 103/00* (2006.01)

(52) U.S. Cl.
CPC .......... *C02F 3/06* (2013.01); *C02F 2103/001* (2013.01); *C02F 2203/00* (2013.01); *C02F 2203/002* (2013.01); *C02F 2209/40* (2013.01); *Y02W 10/15* (2015.05)

(56) References Cited

FOREIGN PATENT DOCUMENTS

| | | |
|---|---|---|
| KR | 10-0879788 B1 | 1/2009 |
| KR | 10-1003477 B1 | 12/2010 |

OTHER PUBLICATIONS

English machine translation of Kunitani (JP 2010131472).*
International Search Report and Written Opinion of the ISA, ISA/KR, Daejeon, dated Dec. 10, 2012.

* cited by examiner

WASTEWATER TREATMENT APPARATUS CAPABLE OF PERFORMING BOTH INITIAL RAINWATER OVERFLOW TREATMENT AND PRIMARY TREATMENT, AND WASTEWATER TREATMENT METHOD ACCORDING TO SAID APPARATUS

CROSS-REFERENCE TO RELATED APPLICATIONS

This application is a 371 U.S. National Stage of International Application No. PCT/KR2012/002649, filed Apr. 6, 2012. The entire disclosures of the above application are incorporated herein by reference.

TECHNICAL FIELD

The present invention relates to a wastewater treatment apparatus and a wastewater treatment method according to the apparatus, and more particularly, to a wastewater treatment apparatus capable of performing both of an initial rainwater overflow treatment and a primary treatment at the same time, which is capable of modifying and changing an existing primary depositing reservoir to an up-flow high-speed filtration facility to be used as a primary treatment or initial rainwater treatment facility according to an amount of rainfall, and thus effectively removing polluted substances generated by initial rainwater, and a wastewater treatment method according to the apparatus.

BACKGROUND ART

Generally, a pollutant load overflowing in a combined sewer system in the event of rain is referred to as combined sewer overflows (CSO).

Here, the CSO of polluted substances according to initial rainwater is larger than an amount of polluted substances generated by outflow water from a sewage treatment plant. That is, in case of a city region, if the rainfall occurs, the polluted substances on a road and in a storm-water sewer are introduced into the sewage treatment plant at the same time due to an increase in a flow rate caused by the rainfall.

Further, when the rainfall occurs, a biochemical oxygen demand (BOD) of the polluted substances introduced into the sewage treatment plant is 150 to 300 mg/L, and a concentration of suspended solids (SS) is 250 to 400 mg/L, and a case in which the concentration of the pollutants is higher than the BOD of sewage occurs frequently.

In Korea, to reduce the amount of the polluted substances generated by the initial rainwater, the BOD of water pollutants is controlled to be 40 mg/L or less and then discharged according to sewage treatment plant standards. To improve a water quality of rivers and lakes, a method of effectively removing the polluted substances generated by the initial rainwater is required.

Figure 1:
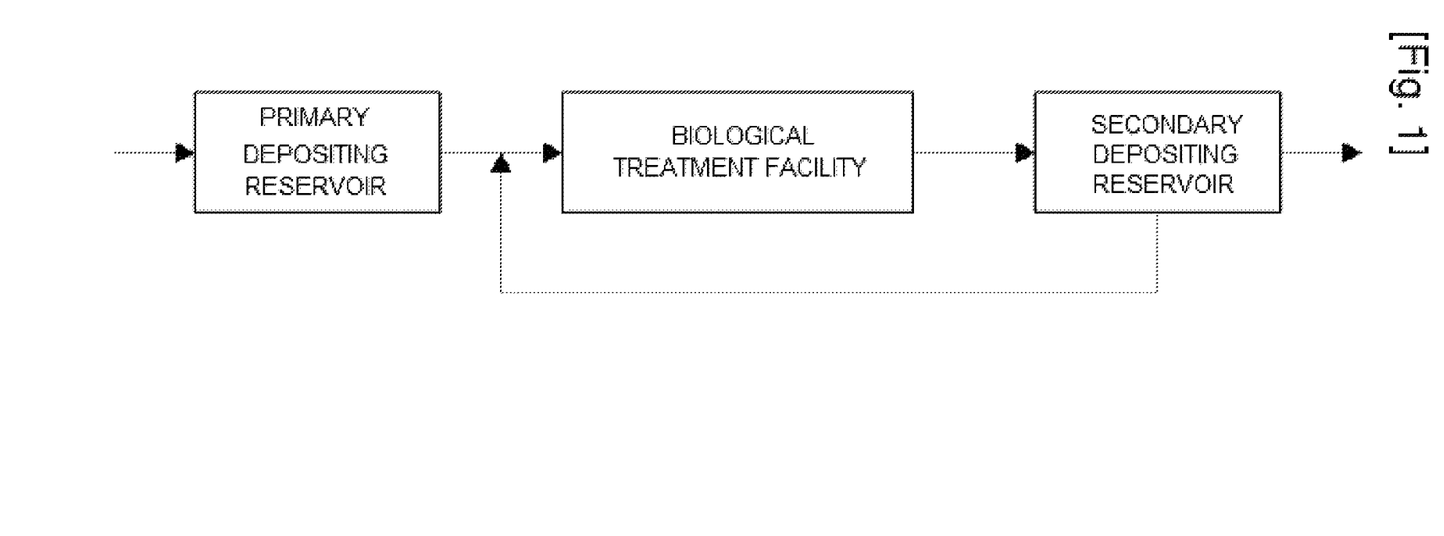
FIG. 1 is a conceptual view schematically illustrating a wastewater treatment process of a conventional wastewater treatment apparatus when a rainfall occurs.

Here, as illustrated in FIG. 1, an existing wastewater treatment facility includes a primary depositing reservoir, a biological treatment facility, and a secondary depositing reservoir.

And in a dry season, a design flow 1Q is introduced and treated in the wastewater treatment facility.

In the existing wastewater treatment facility as described above, when the rainfall occurs, the wastewater and the rainwater are mixed at a combined sewer pipe, and a large quantity of the initial rainwater overflow is introduced therein.

In the case of the initial rainwater overflow, there is a problem that the polluted substances on the road and in the storm-water sewer are washed and introduced at the same time, and thus the BOD of the polluted substances is considerably increased.

Figure 2:
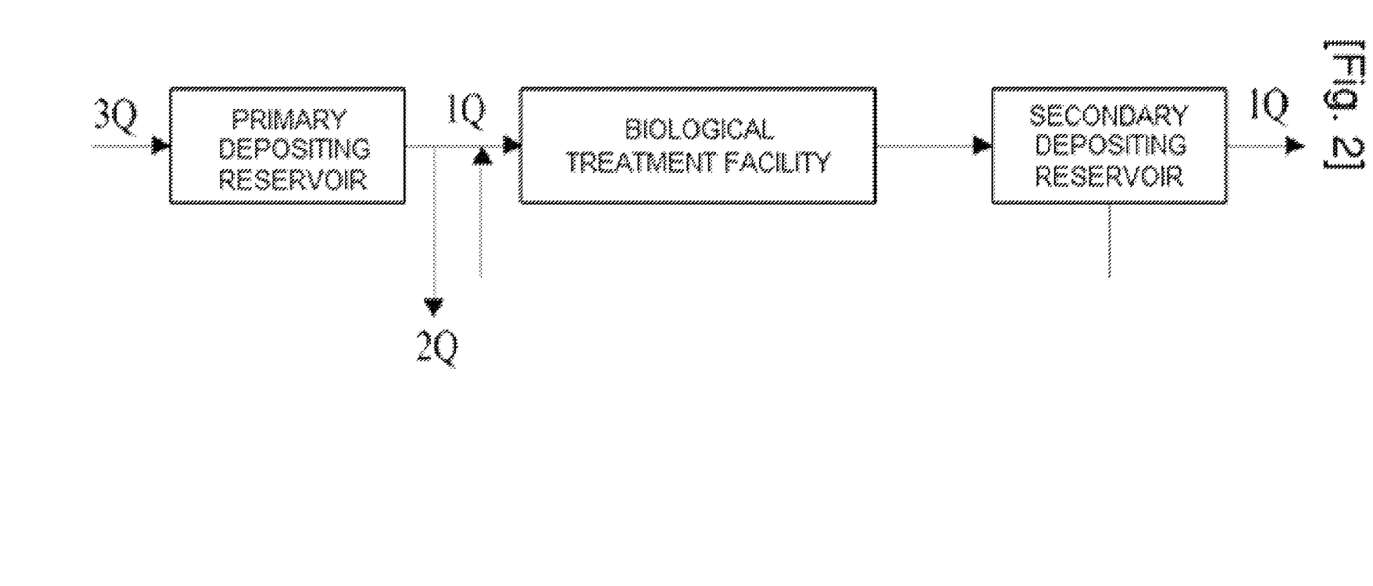
FIG. 2 is a conceptual view schematically illustrating another wastewater treatment process of the conventional wastewater treatment apparatus when the rainfall occurs.

As illustrated in FIG. 2, to solve the problem, it is defined that, when the rainfall occurs, 3Q which is three times the design flow 1Q is introduced and treated by depositing, and then 1Q is treated through a biological treatment, and 2Q is discharged. However, in the sewage treatment plant standards, a filtration rate (a surface loading rate, Q/A), which is a design standard of the primary depositing reservoir, is defined as a value of 25 to 40 $m^2/m^3/d$, and thus the introduction of the 3Q exceeds a facility standard. Therefore, since the primary depositing is not performed, a large amount of solids are introduced into a bioreactor, and thus a treatment efficiency of the wastewater treatment facility is rapidly reduced.

Figure 3:
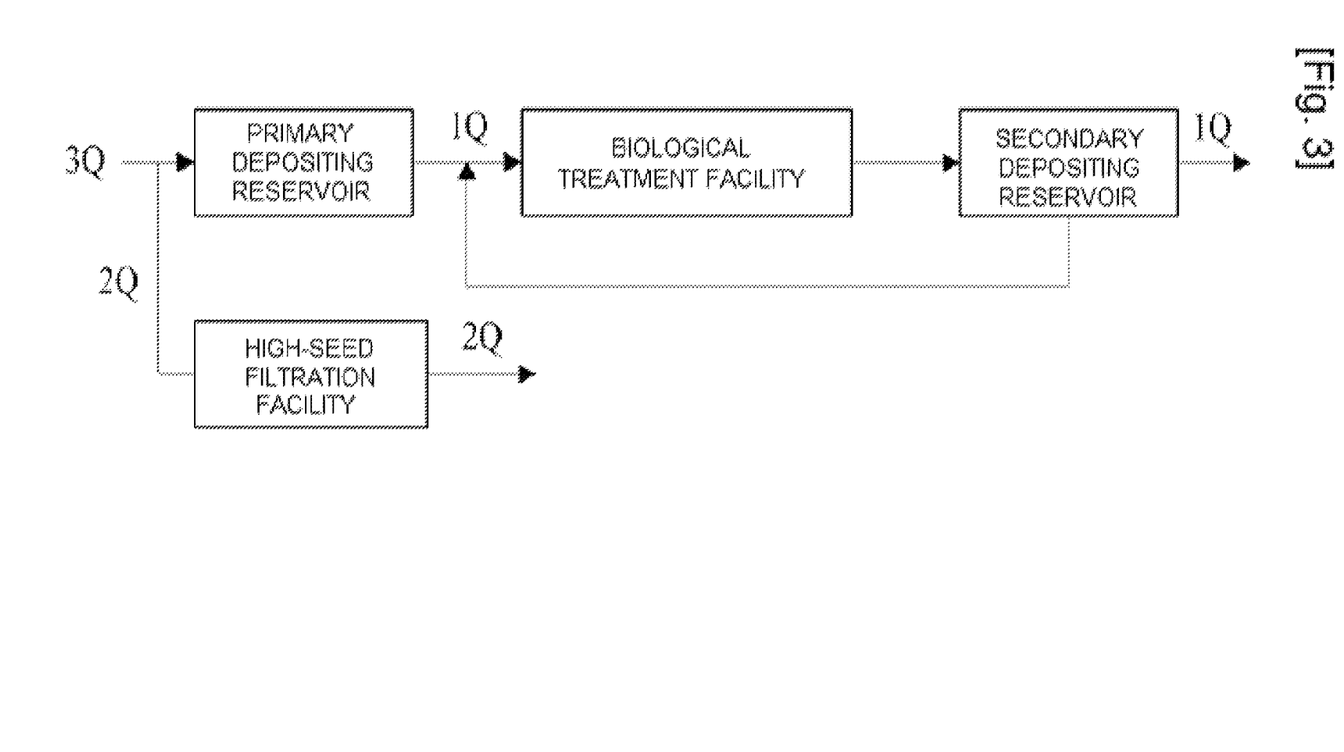
FIG. 3 is a conceptual view schematically illustrating a wastewater treatment process of a wastewater treatment apparatus, which is separately installed at a conventional initial rainwater treatment facility, when the rainfall occurs.

Meanwhile, as illustrated in FIG. 3, to solve the above-mentioned problems, there has been proposed a method in which a separate initial rainwater facility is provided at the existing wastewater treatment facility.

Here, if the initial rainwater facility such as a high-speed filtration facility is provided at the existing wastewater treatment facility, when the rainfall occurs, 3Q which is three times the design flow 1Q is introduced, and 2Q of the 3Q is transferred to and treated in the high-speed filtration facility, and the design flow 1Q introduced into the primary depositing reservoir is treated by a biological treatment facility and then discharged through the secondary depositing reservoir.

As described above, an initial rainwater treatment efficiency may be enhanced by providing the initial rainwater facility such as the high-speed filtration facility at the existing wastewater treatment facility. However, since the initial rainwater facility should be separately provided, construction costs and installation costs occur, and thus it is impossible to introduce the separate facility and apparatus due to the problems of high construction costs and securement of a separate site.

Meanwhile, to solve the problems, in Korean Patent Application No. 10-2008-0047645, there has been proposed a wastewater treatment apparatus for effectively removing polluted substances due to initial rainwater, a method thereof, and a system thereof.

Figure 4:
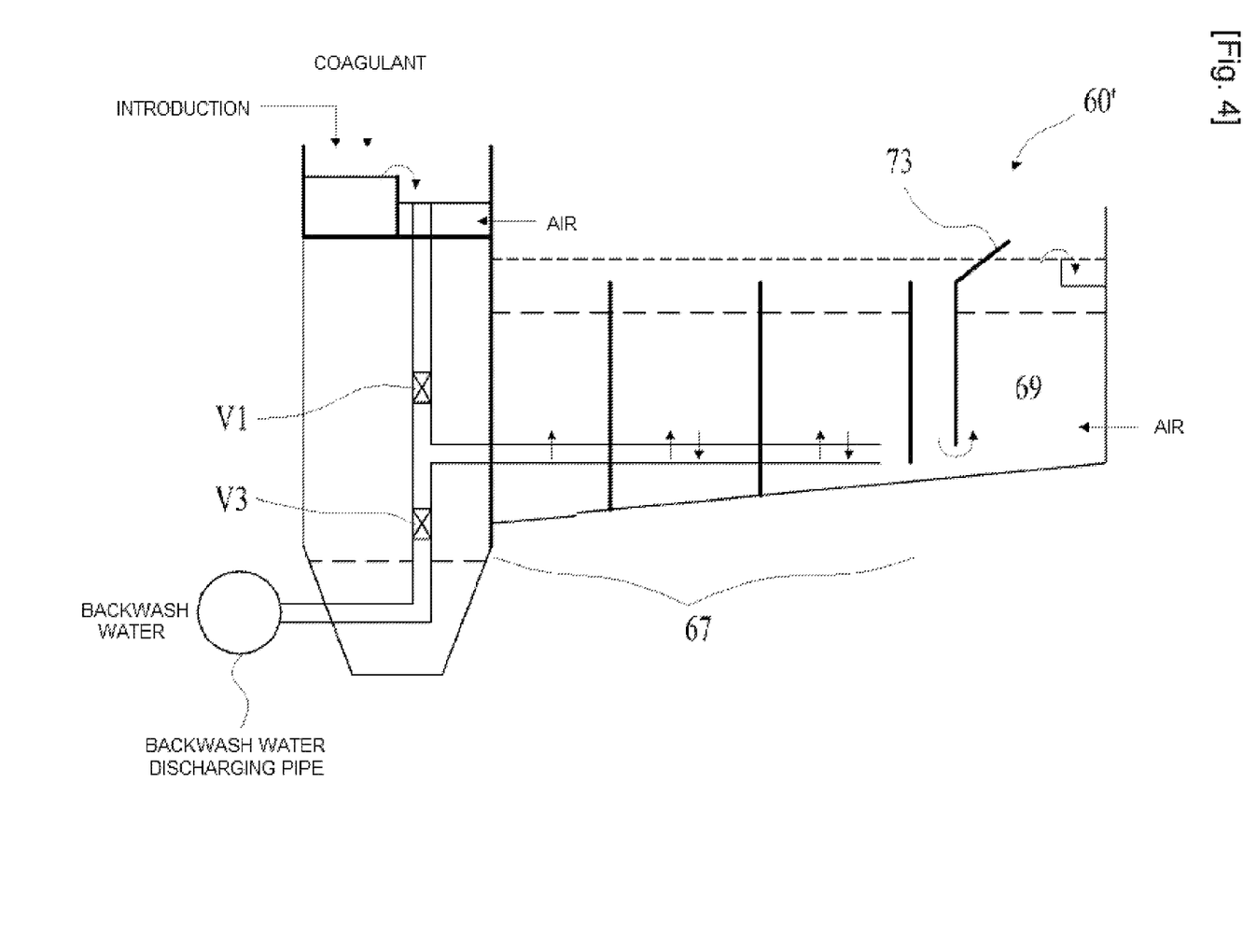
FIG. 4 is a view schematically illustrating a conventional wastewater treatment apparatus in which a primary depositing reservoir is modified to a high-speed filtration facility.

FIG. 4 is a view illustrating an operation of a water level varying partition wall when an amount of the wastewater is relatively small. As illustrated in the drawing, a primary depositing unit 60' includes the water level varying partition wall 73 between a floating matter filter 67 and a biological filter paper 69. The water level varying partition wall 73 controls a flow rate introduced from the floating matter filter 67 to the biological filter paper 69. If head loss is increased, and a flow rate introduced to the biological filter paper 69 is reduced, a residual flow rate automatically flows over the water level varying partition wall 73, and is discharged via a discharge weir 71.

Due to such a structure as described above, part of the existing primary depositing reservoir may be modified into the high-speed filtration facility to treat the initial rainwater. However, since the primary depositing reservoir is modified into the high-speed filtration facility, there is a disadvantage that an index of the primary depositing reservoir is reduced, and the surface loading rate is increased, and thus a depositing efficiency is deteriorated. Further, since a depositing process and a filtering process should be performed at the same time, the maintenance thereof is difficult.

DISCLOSURE

Technical Problem

The present invention is directed to providing a wastewater treatment apparatus capable of performing both of an initial rainwater overflow treatment and a primary treatment, which is capable of modifying an existing primary depositing reservoir to an up-flow high-speed filtration facility so as to performed both of the initial rainwater overflow treatment and the primary treatment at the same time, and providing a floating filter at an existing depositing reservoir to be used as a high-speed filtration facility for the initial rainwater treatment and thus consistently obtaining treated water even when a flow rate and a load are changed, and also being applied to an existing wastewater treatment facility to thereby eliminate a necessity of installing an additional facility for introducing an initial rainwater treatment facility, and also adjusting the flow rate into a biological treatment facility to achieve a target water quality.

Technical Solution

One aspect of the present invention provides a wastewater treatment apparatus capable of performing both of an initial rainwater overflow treatment and a primary treatment, including an up-flow high-speed filtration facility configured to filter a floating matter contained in wastewater using a floating filter; a sludge holding tank configured to hold intermittently generated backwash water and thus equalize a flow rate and a load of a follow-up concentrator; a biological treatment facility configured to remove dissolved organic matter contained in water discharged from the up-flow high-speed filtration facility; and a concentrator configured to increase a concentration of backwash sludge of the sludge holding tank before the backwash sludge is injected to a sludge treatment process.

A backwash water discharging unit configured to discharge the backwash sludge of the up-flow high-speed filtration facility may be provided, and the backwash water discharging unit may transport the backwash sludge to the sludge holding tank.

The biological treatment facility may introduce and then treat a high-concentration organic matter generated from the backwash sludge transported to the sludge holding tank to be concentrated and then treated.

The up-flow high-speed filtration facility may be configured to be modified and changed to a primary depositing reservoir and vice versa.

The primary depositing reservoir may be modified and changed to the up-flow high-speed filtration facility by being divided and partitioned into 2 to 8 units.

The up-flow high-speed filtration facility may be configured to have a filtration rate (a surface loading rate, Q/A) of 5 to 50 m$^3$/hr/m$^2$.

Another aspect of the present invention provides a wastewater treatment method according to a wastewater treatment apparatus capable of performing both of an initial rainwater overflow treatment and a primary treatment, which includes an up-flow high-speed filtration facility, a sludge holding tank, a biological treatment facility, and a concentrator, including changing a primary depositing reservoir to the up-flow high-speed filtration facility when a rainfall occurs; introducing initial rainwater into the up-flow high-speed filtration facility; treating the initial rainwater introduced into the up-flow high-speed filtration facility; introducing and treating part of the initial rainwater treated through the up-flow high-speed filtration facility in a biological treatment facility; introducing and treating part of the initial rainwater treated through the biological treatment facility in a secondary depositing reservoir; and discharging the rest of the rainwater which is not introduced into the biological treatment facility.

The method may further include introducing the initial rainwater with a 1.1Q to 30Q with respect to a design flow Q1 when introducing the initial rainwater into the up-flow high-speed filtration facility.

The method may further include injecting a coagulant into the initial rainwater introduced into the up-flow high-speed filtration facility.

The method may further include introducing a design flow Q1 of the initial rainwater treated through the up-flow high-speed filtration facility into the biological treatment facility.

The method may further include discharging the initial rainwater with a 0.1Q to 29Q with respect to a design flow Q, which is not introduced into the biological treatment facility.

The method may further include bypassing, sterilizing, and discharging the discharged water with the 0.1Q to 29Q with respect to the design flow 1Q, which is treated through the up-flow high-speed filtration facility and then discharged.

The method may further include performing a backwashing process, if head loss occurs, when a filtering process is continued through the up-flow high-speed filtration facility.

The method may further include transporting backwash sludge generated in a backwashing process to a backwashing holding tank, and concentrating and treating the backwashing sludge.

The method may include changing the up-flow high-speed filtration facility to the primary depositing reservoir in a dry season; introducing wastewater of a design flow Q1 into the primary depositing reservoir; treating the wastewater introduced into the primary depositing reservoir; introducing and treating the wastewater treated through the primary depositing reservoir in a biological treatment facility; introducing and re-treating the wastewater treated through the biological treatment facility in a secondary depositing reservoir; and discharging the wastewater treated in the secondary depositing reservoir.

Advantageous Effects

According to the present invention having the above-mentioned configuration, the polluted substances generated by the initial rainwater can be effectively removed, the water quality of rivers and lakes can be easily improved, the rapid removing of the solids and the effective oxidizing of the dissolved organic matter can be achieved, and also the treated water can be consistently obtained, even when the flow rate and the load are changed, Also, the present invention can reduce the additional costs, such as the installation costs and the construction costs, for installing the apparatus to the existing wastewater treatment facility, thereby reducing the installation area and the installation costs of the sewage treatment facility, and also can perform both of the depositing process and the filtering process at the same time, thereby easily maintaining the wastewater treatment facility.

The present invention can adjust the flow rate to achieve the target water quality, can prevent the index of the primary depositing reservoir from being reduced, can also prevent the surface loading rate from being increased, and thus can prevent the deterioration of the depositing efficiency.

DETAILED DESCRIPTION OF MAIN ELEMENT

1: wastewater treatment apparatus capable of performing both of the initial rainwater overflow treatment and the primary treatment
10: up-flow high-speed filtration facility
20: sludge holding tank
30: biological treatment facility
40: concentrator
50: primary depositing reservoir
60: backwash water discharging unit

MODES OF THE INVENTION

Hereinafter, exemplary embodiments of the present invention will be described in detail with reference to the accompanying drawings. However, the exemplary embodiments are not intended to limit the scope of the invention, so it should be understood that other equivalents and modifications could be made thereto without departing from the spirit and scope of the invention.

Figure 5:
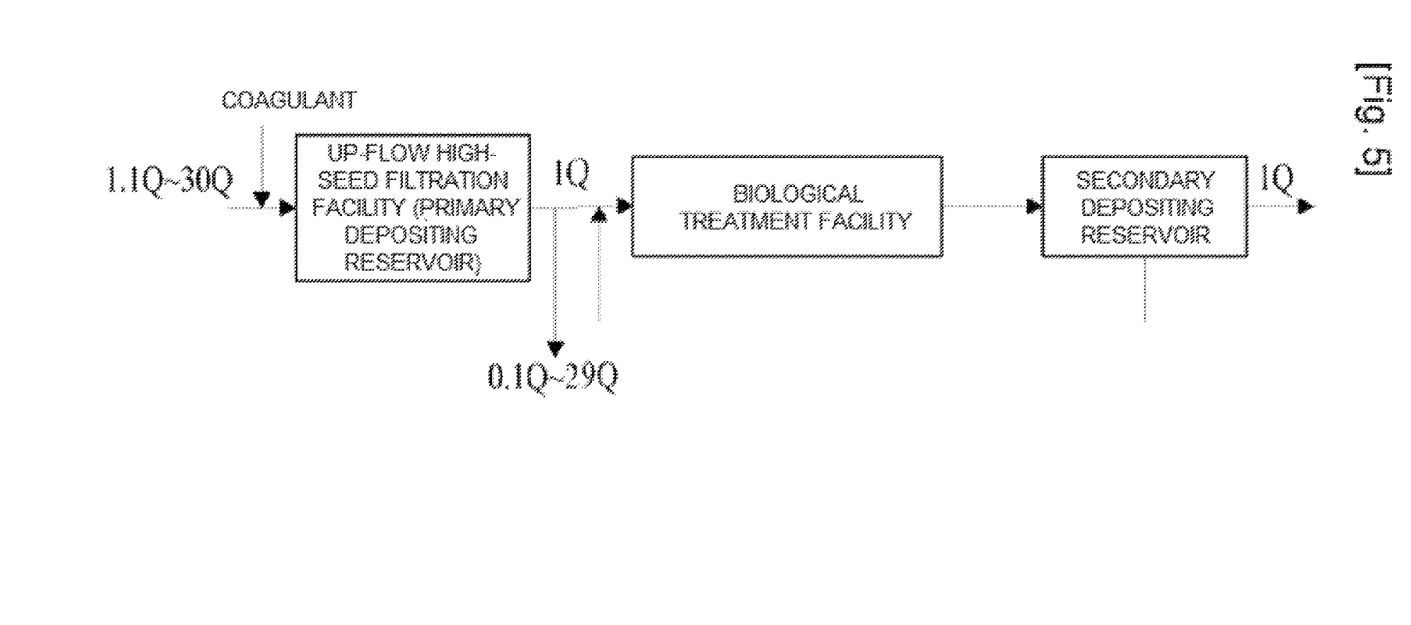
FIG. 5 is a conceptual view schematically illustrating a wastewater treatment process of a wastewater treatment apparatus capable of performing both of an initial rainwater overflow treatment and a primary treatment at the same time according to the present invention, when a rainfall occurs.
Figure 6:
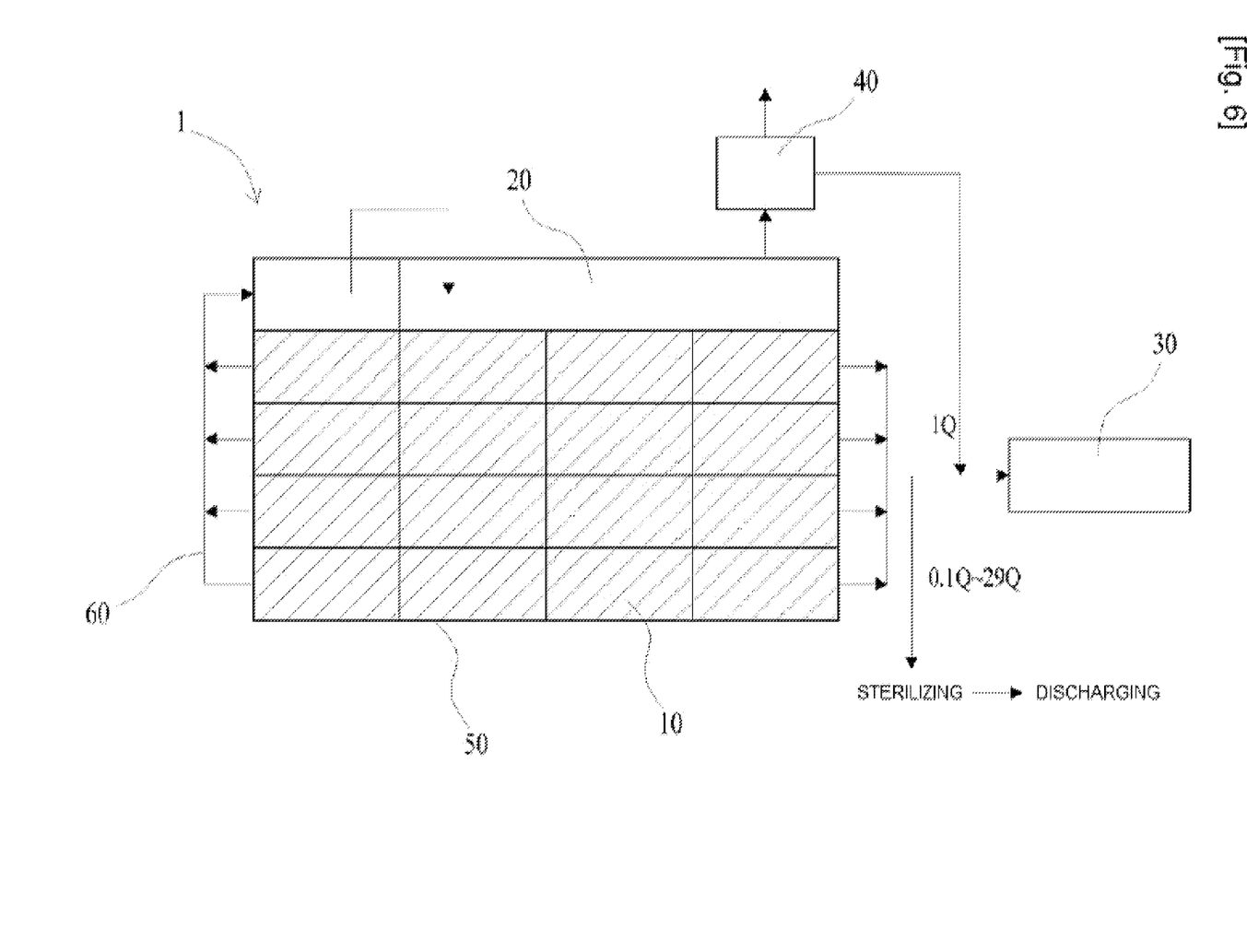
FIG. 6 is a plan view schematically illustrating the wastewater treatment process of the wastewater treatment apparatus capable of performing both of the initial rainwater overflow treatment and the primary treatment at the same time according to the present invention, when the rainfall occurs.
Figure 7:
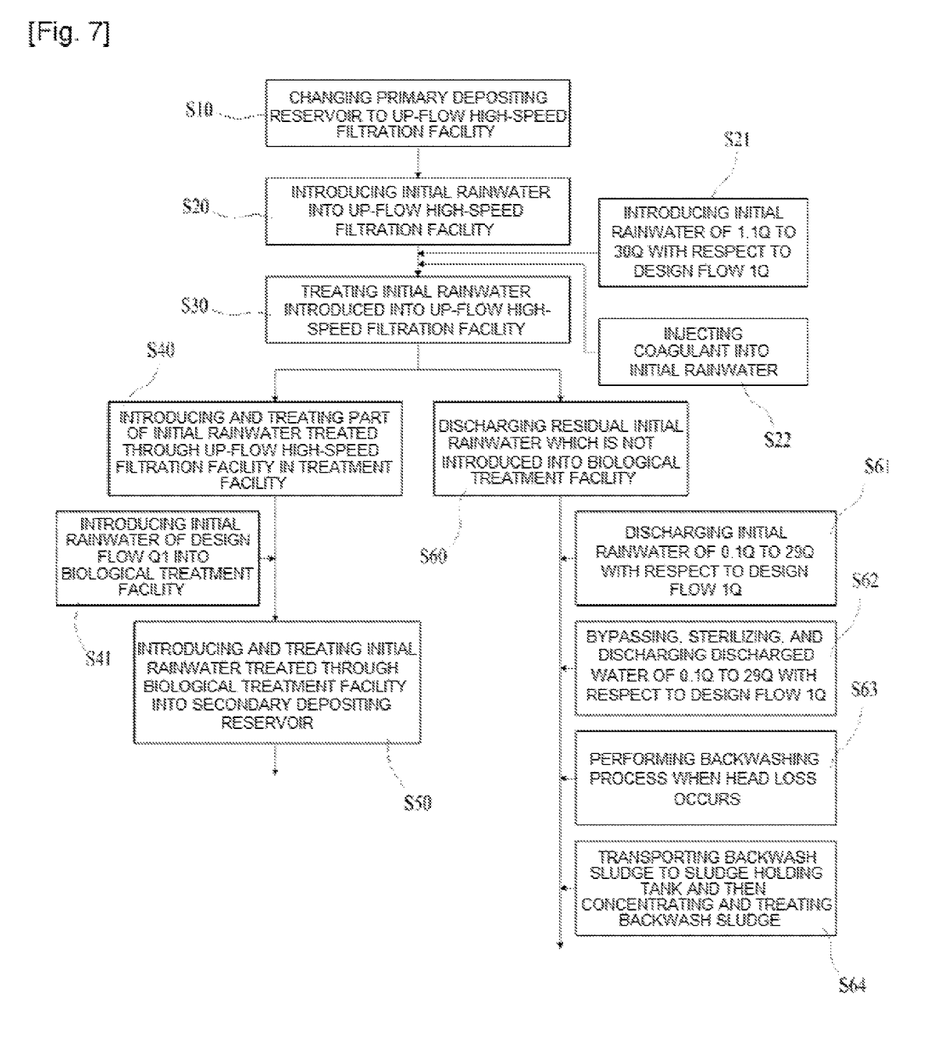
FIG. 7 is a flow chart schematically illustrating a wastewater treatment method in the wastewater treatment apparatus capable of performing both of the initial rainwater overflow treatment and the primary treatment at the same time according to the present invention, when the rainfall occurs.
Figure 8:
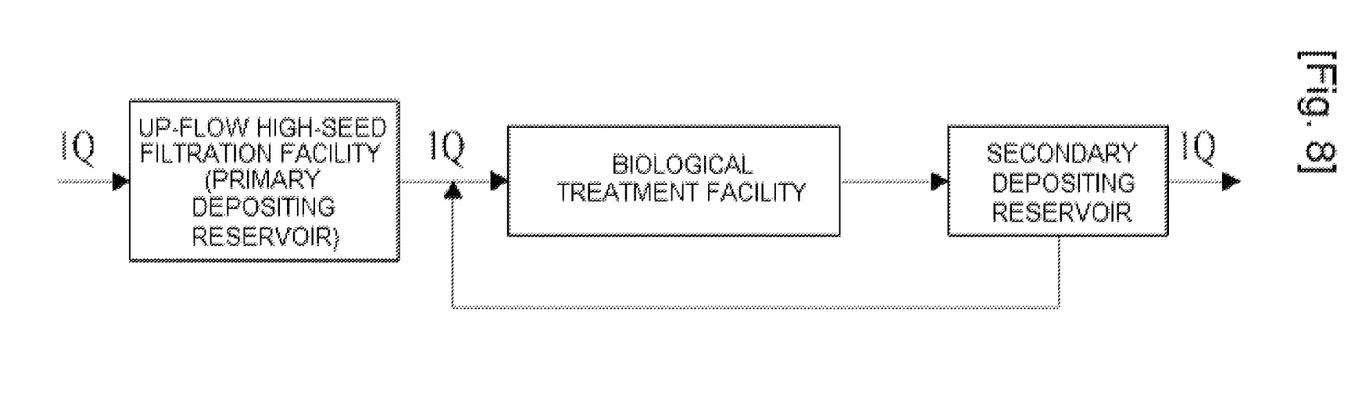
FIG. 8 is a conceptual view schematically illustrating the wastewater treatment process of the wastewater treatment apparatus capable of performing both of the initial rainwater overflow treatment and the primary treatment at the same time according to the present invention, in a dry season.
Figure 9:
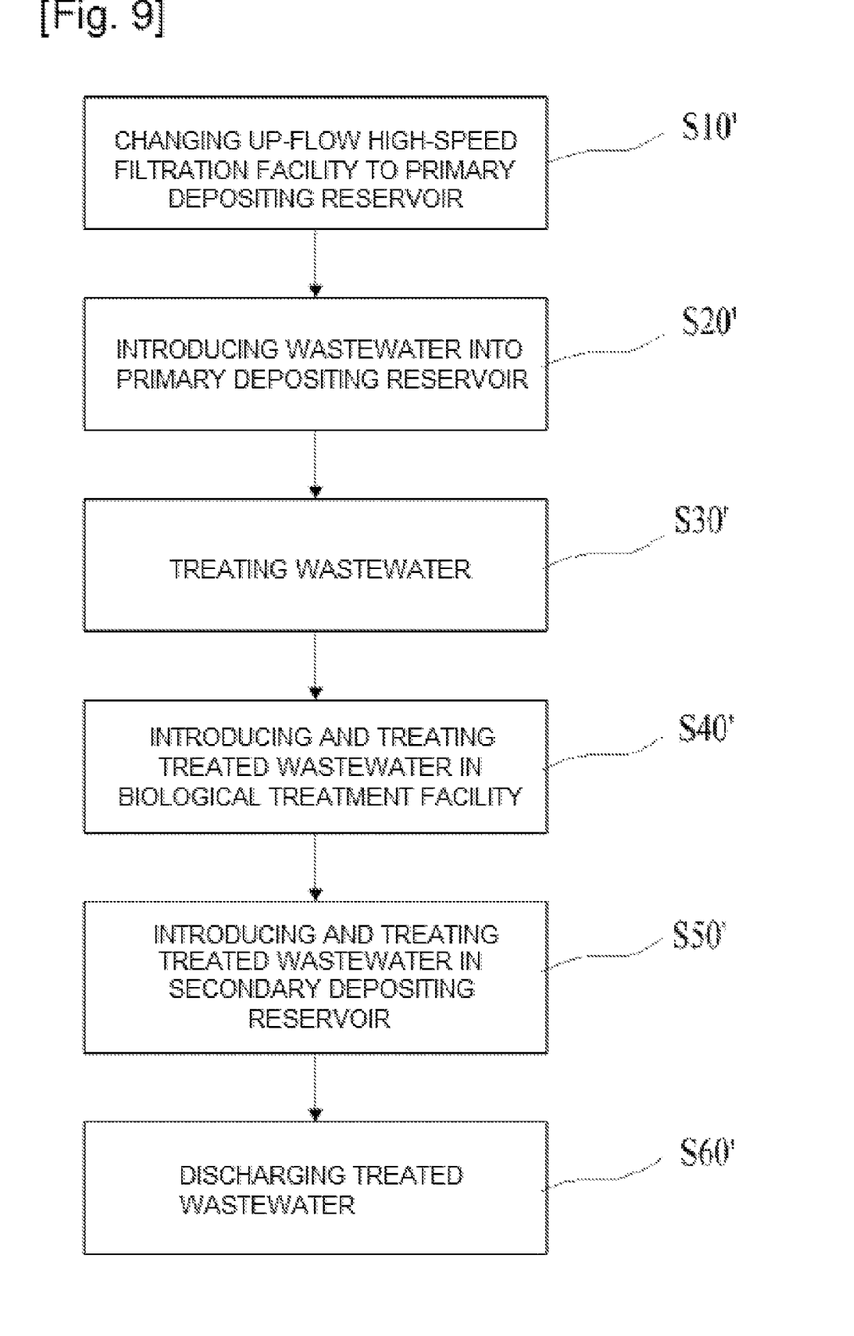
FIG. 9 is a flow chart schematically illustrating a wastewater treatment method in the wastewater treatment apparatus capable of performing both of the initial rainwater overflow treatment and the primary treatment at the same time according to the present invention, in the dry season.

FIG. 5 is a conceptual view schematically illustrating a wastewater treatment process of a wastewater treatment apparatus capable of performing both of an initial rainwater overflow treatment and a primary treatment at the same time according to the present invention, when a rainfall occurs, FIG. 6 is a plan view schematically illustrating the wastewater treatment process of the wastewater treatment apparatus capable of performing both of the initial rainwater overflow treatment and the primary treatment at the same time according to the present invention, when the rainfall occurs, FIG. 7 is a flow chart schematically illustrating a wastewater treatment method in the wastewater treatment apparatus capable of performing both of the initial rainwater overflow treatment and the primary treatment at the same time according to the present invention, when the rainfall occurs, FIG. 8 is a conceptual view schematically illustrating the wastewater treatment process of the wastewater treatment apparatus capable of performing both of the initial rainwater overflow treatment and the primary treatment at the same time according to the present invention, in a dry season, and FIG. 9 is a flow chart schematically illustrating a wastewater treatment method in the wastewater treatment apparatus capable of performing both of the initial rainwater overflow treatment and the primary treatment at the same time according to the present invention, in the dry season.

As illustrated in the drawings, the wastewater treatment apparatus 1 capable of performing both of an initial rainwater overflow treatment and a primary treatment at the same time according to the present invention includes an up-flow high-speed filtration facility 10, a sludge holding tank 20, a biological treatment facility 30, and a concentrator 40.

Here, the up-flow high-speed filtration facility 10 serves to filter floating matter contained in wastewater using a floating filter (not shown). Preferably, the up-flow high-speed filtration facility 10 is separately provided, but a primary depositing reservoir 50 applied to an existing wastewater treatment apparatus may be modified and used as the up-flow high-speed filtration facility 10.

To this end, the existing primary depositing reservoir 50 having a rectangular or circular shape is divided and partitioned into 2 to 8 units, and then modified and changed to the up-flow high-speed filtration facility 10.

As described above, when the existing primary depositing reservoir 50 is modified to and used as the up-flow high-speed filtration facility 10, the up-flow high-speed filtration facility 10 is designed to have a filtration rate (a surface loading rate, Q/A) of 5 to 50 $m^3/hr/m^2$.

That is, the existing primary depositing reservoir 50 having a filtration rate (a surface loading rate, Q/A) of 25 to 40 $m^3/hr/m^2$ is modified to the up-flow high-speed filtration facility 10 having the filtration rate (a surface loading rate, Q/A) of 5 to 50 $m^3/hr/m^2$.

Like this, when the existing primary depositing reservoir 50 is modified to the up-flow high-speed filtration facility 10, the filtration rate (a surface loading rate, Q/A) is 5 to 50 times faster than the existing one in theory, and thus a flow rate which is 5 to 50 times larger than that in the existing wastewater treatment apparatus may be treated.

At this time, the up-flow high-speed filtration facility 10 is formed to be modified and changed to the primary depositing reservoir 50 and vice versa.

By the above-mentioned structure, when the rainfall occurs, it is possible to be modified and changed to the up-flow high-speed filtration facility 10 and thus treat a large quantity of initial rainwater, and in a dry season, it is possible to be modified and changed to the primary depositing reservoir 50 and thus treat a constant quantity of wastewater.

In one embodiment of the present invention, a sludge holding tank 20 configured to hold backwash sludge generated in a high speed filtering process. The sludge holding tank 20 may use the existing primary depositing reservoir or may be newly installed. Here, since an SS concentration of the backwashing sludge is 3,500 to 5000 mg/L, the backwash sludge should be concentrated to be introduced into a sludge treatment process. In the case of the backwash sludge, since it is intermittently discharged, the holding tank for controlling a flow rate thereof is necessarily required.

The biological treatment facility 30 serves to remove dissolved organic matter contained in water discharged from the up-flow high-speed filtration facility 10. The biological treatment facility 30 is connected with the up-flow high-speed filtration facility 10.

Here, the biological treatment facility 30 introduces a high-concentration organic matter such as a concentrated supernatant generated from the backwash sludge which is transferred to and concentrated and treated in the sludge holding tank 20.

And, the biological treatment facility 30 is connected with a secondary depositing reservoir (not shown), and the wastewater treated in the biological treatment facility 30 is introduced into the secondary depositing reservoir and then treated and discharged.

The concentrator 40 serves to concentrate the backwash sludge generated at the time of a backwashing process to have an SS concentration of 4 to 5% and then to introduce the concentrated backwash sludge into a sludge treatment process (not shown). The concentrator 40 may be a mechanical concentrator or a gravity type sludge concentrator.

Meanwhile, a backwash water discharging unit 60 which discharges the backwash sludge is provided at the up-flow high-speed filtration facility. The backwash water discharging unit 60 transports the backwash sludge to the sludge holding tank 20.

Here, the backwash water discharging unit 60 includes a backwash water discharge valve (not shown) and a backwash air injection unit (not shown). As a filtering process is performed, head loss occurs. If a predetermined amount of the head loss occurs, an introduction of the backwash water is blocked, and then the backwash water discharge valve is opened to perform the backwashing process.

Since the treated water located above the filter paper is used as the backwash water, it is not necessary to separately supply the backwash water. If only the backwash water discharge valve is opened, the backwash water is discharged in a gravitational flowing manner, and the solids filtered by the filter are discharged together with the backwash water to a lower side of the filter paper.

Backwash air is used only when a strong backwashing process is required. The strong backwashing process is performed by opening the backwash water discharge valve, discharging the backwash water, closing the backwash water discharge valve, injecting the backwash air, blocking the backwash air, opening the backwash water discharge valve, and closing the backwash water discharge valve in turn.

An introduction pipe (not shown) through which the initial rainwater is introduced, and a discharge pipe (not shown) through which the sludge of the introduced initial rainwater is discharged are provided at the up-flow high-speed filtration facility 10.

Hereinafter, a wastewater treatment method in the wastewater treatment apparatus 1 capable of performing both of the initial rainwater overflow treatment and the primary treatment according to the present invention will be described with reference to FIG. 7.

Firstly, when the rainfall occurs, the existing primary depositing reservoir 50 is modified and changed to the up-flow high-speed filtration facility 10 (S10). That is, when the rainfall occurs, because the polluted substances on the road and in the storm-water sewer are introduced into the sewage treatment plant at the same time due to an increase in a flow rate caused by the rainfall, and thus the CSO of polluted substances according to the initial rainwater is larger than an amount of polluted substances generated by outflow water from the sewage treatment plant, the primary depositing reservoir 50 is modified and changed to the up-flow high-speed filtration facility 10 to treat the large amount of the wastewater.

After the primary depositing reservoir 50 is modified and changed to the up-flow high-speed filtration facility 10, the initial rainwater is introduced into the up-flow high-speed filtration facility 10 (S20).

At this time, when the initial rainwater is introduced into the up-flow high-speed filtration facility 10, the initial rainwater of 1.1Q to 30Q with respect to a design flow 1Q is introduced (S21).

That is, when the initial rainwater is introduced into the up-flow high-speed filtration facility 10, the initial rainwater of 1.1Q to 30Q which is 1.1 to 30 times the design flow 1Q is introduced.

A coagulant is injected into the initial rainwater introduced into the up-flow high-speed filtration facility 10 (S22). As described above, the coagulant is injected to condense a colloidal solution mainly contained in the initial rainwater introduced into the up-flow high-speed filtration facility 10 and thus increase a filtering efficiency.

As described above, after the coagulant is injected to the initial rainwater introduced into the up-flow high-speed filtration facility 10 and thus the initial rainwater introduced is treated by the coagulant, the initial rainwater introduced into the up-flow high-speed filtration facility 10 is treated (S30). That is, the initial rainwater is introduced into the up-flow high-speed filtration facility 10, and then the floating matter contained in the wastewater of the initial rainwater are filtered and treated using the floating filter provided in the up-flow high-speed filtration facility 10.

Then, part of the initial rainwater treated through the up-flow high-speed filtration facility 10 is introduced into and treated in the biological treatment facility 30 (S40).

At this time, the design flow 1Q of the initial rainwater treated through the up-flow high-speed filtration facility 10 is introduced into the biological treatment facility 30 (S41). That is, the treated initial rainwater of the design flow 1Q treated through the up-flow high-speed filtration facility 10 of the initial rainwater of 30Q introduced into the up-flow high-speed filtration facility 10 is introduced into the biological treatment facility 30.

Then, the initial rainwater treated through the biological treatment facility 30 is introduced into and treated in the secondary depositing reservoir (S50).

Meanwhile, the residual initial rainwater which is not introduced from the up-flow high-speed filtration facility 10 to the biological treatment facility 30 is discharged (S60).

Here, the initial rainwater of 0.1Q to 29Q with respect to the design flow 1Q, which is not introduced from the up-flow high-speed filtration facility 10 to the biological treatment facility 30, is discharged (S61).

And, the discharged water of 0.1Q to 29Q with respect to the design flow 1Q, which is treated through the up-flow high-speed filtration facility 10 and then discharged, is bypassed, sterilized, and then discharged (S62).

At this time, when the filtering process through the up-flow high-speed filtration facility 10 is continued, the backwashing process is performed if the head loss occurs (S63).

As described above, if the filtering process through the up-flow high-speed filtration facility 10 is continued, and the head loss occurs, the backwashing process is performed. The backwash sludge generated in the backwashing process is transported to the sludge holding tank 20, and the transported backwash sludge is concentrated and then treated (S64).

Preferably, because of a high concentration of the organic matter in the concentrated supernatant to be generated, the backwash sludge is introduced into and treated in the biological treatment facility 30.

Meanwhile, in the wastewater treatment method according to the wastewater treatment apparatus capable of performing both of the initial rainwater overflow treatment and the primary treatment according to the present invention, a wastewater treatment method in the dry season will be described with reference to FIGS. 8 and 9.

Firstly, in the dry season, the up-flow high-speed filtration facility 10 is changed to the primary depositing reservoir 50 to treat the wastewater (S10').

As described above, in the dry season, the up-flow high-speed filtration facility 10 is changed to the primary depositing reservoir 50, and the wastewater of the design flow 1Q is introduced into the primary depositing reservoir 50 (S20').

And, the wastewater introduced into the primary depositing reservoir 50 is treated (S30'). As described above, the wastewater introduced from the primary depositing reservoir 50 is treated, and then the wastewater treated through the primary depositing reservoir 50 is introduced into and treated in the biological treatment facility 30 (S40').

Then, the wastewater treated in the biological treatment facility 30 is introduced into and treated in the secondary depositing reservoir (S50'), and then the wastewater treated in the biological treatment facility 30 is discharged (S60').

As described above, the existing primary depositing reservoir 50 is modified and changed to the up-flow high-speed filtration facility 10 according to the dry season or the rainy season, and thus a separate site and an investment in facilities for installing the up-flow high-speed filtration facility 10 are not needed, and thus the present invention may be directly applied to the existing wastewater treatment facility.

Although a few embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. A wastewater treatment apparatus capable of performing both an initial rainwater overflow treatment and a primary treatment, comprising:
a primary depositing reservoir facility configured to form an up-flow high-speed filtration facility in response to rainfall, wherein the up-flow high-speed filtration facility is configured to filter floating matter contained in wastewater at a filtration rate of 5 $m^3/hr/m^2$ to 50 $m^3/hr/m^2$ using a floating filter, wherein an initial rainwater of 1.1Q to 30Q with respect to a design flow 1Q is introduced into the up-flow high-speed filtration facility;
a sludge holding tank configured to hold intermittently generated backwash water, wherein the sludge holding tank equalizes a flow rate and a load of a concentrator configured to increase a configured to increase a concentration of the backwash water before the backwash water is injected into a sludge treatment process; and
a biological treatment facility configured to remove dissolved organic matter contained in water discharged from the primary depositing reservoir facility and a part of the treated initial rainwater from the up-flow high-speed filtration facility, wherein residual treated initial rainwater is bypassed, sterilized, and discharged.

2. The wastewater treatment apparatus of claim 1, further comprising:
a backwash water discharging unit configured to discharge the backwash water of the up-flow high-speed filtration facility and transport the backwash water to the sludge holding tank.

3. The wastewater treatment apparatus of claim 2, wherein the biological treatment facility introduces and treats high-concentration organic matter generated from the backwash water transported to the sludge holding tank to be concentrated and treated.

4. The wastewater treatment apparatus of claim 1, wherein the primary depositing reservoir facility is modified and changed to the up-flow high-speed filtration by being divided and partitioned into 2 to 8 units.

5. A wastewater treatment method according to a wastewater treatment apparatus capable of performing both an initial rainwater overflow treatment and a primary treatment, wherein the wastewater treatment apparatus comprises a primary depositing reservoir facility, a sludge holding tank, a biological treatment facility, and a concentrator, the method comprising:
modifying and changing the primary depositing reservoir to an up-flow high-speed filtration facility when a rainfall occurs, wherein the up-flow high-speed filtration facility is configured to filter floating matter contained in wastewater at a filtration rate of 5 $m^3/hr/m^2$ to 50 $m^3/hr/m^2$;
introducing initial rainwater of 1.1Q to 30Q with respect to a design flow 1Q into the up-flow high-speed filtration facility;
treating the introduced initial rainwater using the up-flow high-speed filtration facility;
introducing into a biological treatment facility a part of the initial rainwater treated by the up-flow high-speed filtration facility;
treating the part of the initial rainwater treated by the up-flow high-speed filtration facility using the biological treatment facility;
introducing into a secondary depositing reservoir the part of the initial rainwater treated through the biological treatment facility;
treating the part of the initial rainwater treated through the biological treatment facility using the secondary depositing reservoir; and
bypassing, sterilizing, and discharging the residual rainwater of the rainwater not introduced into the biological treatment facility.

6. The wastewater treatment method of claim 5, further comprising:
injecting a coagulant into the initial rainwater introduced into the up-flow high-speed filtration facility.

7. The wastewater treatment method of claim 5, further comprising:

performing a backwashing process if head loss occurs when the up-flow high-speed filtration facility treats the initial rainwater.

8. The wastewater treatment method of claim 5, further comprising:

transporting backwash sludge generated in a backwashing process to a backwashing holding tank, wherein the backwash sludge is concentrated and treated within the backwashing holding tank.

9. The wastewater treatment method of claim 5, further comprising:

modifying and changing the up-flow high-speed filtration facility to the primary depositing reservoir in the absent of rainfall;

introducing wastewater with a design flow Q1 into the primary depositing reservoir;

treating the wastewater introduced into the primary depositing reservoir;

introducing the wastewater treated through the primary depositing reservoir into a biological treatment facility;

treating the wastewater the wastewater treated through the primary depositing reservoir using the biological treatment facility;

introducing the wastewater treated through the biological treatment facility into a secondary depositing reservoir;

re-treating the wastewater treated through the biological treatment facility using the secondary depositing reservoir; and discharging the wastewater treated in the secondary depositing reservoir.

\* \* \* \* \*